(12) United States Patent
Li et al.

(10) Patent No.: US 11,095,970 B1
(45) Date of Patent: Aug. 17, 2021

(54) DETERMINATION OF CHARGE LEVEL OF INACTIVE BLUETOOTH DEVICE

(71) Applicant: Lenovo (Singapore) Pte. Ltd., Singapore (SG)

(72) Inventors: Scott Wentao Li, Cary, NC (US); Robert Norton, Raleigh, NC (US); Russell Speight VanBlon, Raleigh, NC (US); Robert J. Kapinos, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/792,211

(22) Filed: Feb. 15, 2020

(51) Int. Cl.
*H04R 1/10* (2006.01)
*H04R 5/02* (2006.01)
*H04W 4/80* (2018.01)
*H04M 1/72412* (2021.01)

(52) U.S. Cl.
CPC ...... *H04R 1/1025* (2013.01); *H04M 1/72412* (2021.01); *H04W 4/80* (2018.02); *H04R 2225/33* (2013.01)

(58) Field of Classification Search
CPC ... H04R 1/1025; H04R 2225/33; H04W 4/80; H04M 1/72412
USPC .................................................. 381/74, 311
See application file for complete search history.

(56) References Cited

U.S. PATENT DOCUMENTS

| | | | |
|---|---|---|---|
| 2016/0029114 A1* | 1/2016 | Chen | H04R 1/1041 381/74 |
| 2019/0033384 A1* | 1/2019 | Karner | G06F 3/0484 |

OTHER PUBLICATIONS

IEEE Transactions on Industrial Electronics, vol. 57, No. 12, Dec. 2010) (Year: 2010).*

* cited by examiner

*Primary Examiner* — Ammar T Hamid
(74) *Attorney, Agent, or Firm* — John M. Rogitz; John L. Rogitz (57) ABSTRACT

In one aspect, a first device may include at least one processor and storage accessible to the at least one processor. The storage may include instructions executable by the at least one processor to determine, while the first device is not in communication with a second device and/or while the second device is in an inactive state, an estimated current charge level of a battery in the second device. The instructions may also be executable to provide a notification to charge the battery in the second device responsive to a determination that the estimated current charge level does not meet a predetermined threshold charge level.

20 Claims, 6 Drawing Sheets

DETERMINATION OF CHARGE LEVEL OF INACTIVE BLUETOOTH DEVICE

FIELD

The present application relates to technically inventive, non-routine solutions that are necessarily rooted in computer technology and that produce concrete technical improvements.

BACKGROUND

Bluetooth communication-enabled devices such as Bluetooth headsets and Bluetooth speakers can drain their battery power while in an off state. This might be by design to maximize battery life, because individual components within the Bluetooth device might still drain battery power while the device is in the off state, or because the battery itself simply loses charge over time.

As recognized herein, while these types of devices might indicate their low battery charge levels when a user goes to use the device again, this is often too late as the user might not be near a charger or power source in order to charge the device, and even then immediate use is unlikely as the device might still have to charge before use. There are currently no adequate solutions to the foregoing computer-related, technological problem.

SUMMARY

Accordingly, in one aspect a first device includes at least one processor, a Bluetooth transceiver accessible to the at least one processor, and storage accessible to the at least one processor. The storage includes instructions executable by the at least one processor to communicate with a second device via Bluetooth communication using the Bluetooth transceiver to determine a first current battery charge level of a battery in the second device. The instructions are also executable to disconnect from Bluetooth communication with the second device and, while disconnected from Bluetooth communication with the second device, determine a second current battery charge level of the battery in the second device. The second current battery charge level is less than the first current battery charge level. The instructions are also executable to provide a notification to charge the battery in the second device responsive to the current battery charge level not meeting a predetermined threshold battery charge level.

In some implementations, the first current battery charge level may be the current battery charge level at a first time, and the second current battery charge level may be the current battery charge level at a second time that is after the first time.

Also, in some implementations, the second current battery charge level may be determined based on the first current battery charge level and a history of past battery charge levels. Additionally, or alternatively, the second current battery charge level may be determined both based on the first current battery charge level and using an artificial neural network to infer the second current battery charge level from the first current battery charge level.

In certain examples, the first device may include a display accessible to the at least one processor and the instructions may be executable to provide the notification at least in part by presenting a visual notification on the display. Additionally, or alternatively, the first device may include a speaker accessible to the at least one processor and the instructions may be executable to provide the notification at least in part by presenting an audio notification via the speaker.

Still further, in some examples the instructions may be executable to provide the notification by transmitting a command to the second device to awake from an inactive state and to one or more of produce a sound at the second device to indicate the battery should be charged, produce a haptic vibration at the second device to indicate the battery should be charged, and/or illuminate a display on the second device to indicate the battery should be charged. The inactive state may include one or more of a sleep state, a hibernation state, and/or an off state.

Regarding the second device, in some examples it may be a Bluetooth headset. In other examples, it may be a Bluetooth keyboard or a Bluetooth speaker.

Additionally, in some implementations the predetermined threshold may be set by an end-user prior to the determination of the second current battery charge level.

In another aspect, a method includes determining, at a first device and while a second device is in an inactive state, an estimated current charge level of a battery in the second device. The method also includes providing a notification to charge the battery in the second device responsive to determining that the estimated current charge level does not meet a predetermined threshold charge level.

The estimated current charge level not meeting the predetermined threshold charge level may include the estimated current charge level being below the predetermined threshold charge level. The inactive state may include one or more of a sleep state, a hibernation state, and/or an off state. Providing the notification may include one or more of providing a visual notification at the first device and/or providing an audible notification at the first device.

Further, in some implementations the method may include determining the estimated current charge level of the battery in the second device at least in part based on a last-reported current charge level of the second device while the second device was in communication with the first device. Thus, for example, determining the estimated current charge level of the battery may include providing both the last-reported current charge level and an amount of time that has passed since the last-reported current charge level was reported to an artificial neural network as input. An output indicating the estimated current charge level of the battery may then be received from the artificial neural network. Additionally, note that in some examples the last-reported current charge level of the second device may have been provided to the first device by the second device via Bluetooth communication.

In another aspect, at least one computer readable storage medium (CRSM) that is not a transitory signal includes instructions executable by at least one processor. The instructions are executable to determine, at a first device and while the first device is not in communication with a second device, an estimated current charge level of a battery in the second device. The instructions are also executable to provide a notification to charge the battery in the second device responsive to a determination that the estimated current charge level does not meet a predetermined threshold charge level.

In some examples, the instructions may be executable to determine the estimated current charge level of the battery in the second device based on an output from an artificial neural network configured to determine estimated current charge levels of the battery. Also, in some examples, the instructions may be executable to provide the notification to charge the battery in the second device at least in part by presenting a graphical indication on a display that the battery should be charged before a predicted upcoming activity.

The details of present principles, both as to their structure and operation, can best be understood in reference to the accompanying drawings, in which like reference numerals refer to like parts, and in which:

DETAILED DESCRIPTION

The present application discloses use of Bluetooth or other short-range wireless communication for a first device to query the state of the battery charge of a second device. The first device (e.g., a smart phone or personal computer) may then store battery-related information regarding the second device and, even when not still communicating with the second device, model the current battery charge level of the second device based on the previously-known battery state. If the modeled current battery charge level exceeds (e.g., drops below) a preset threshold such as a battery level below one hour of device usage remaining, an alarm event may be raised at the first device to alert the user that the battery of the second device needs attention/should be charged.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general-purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
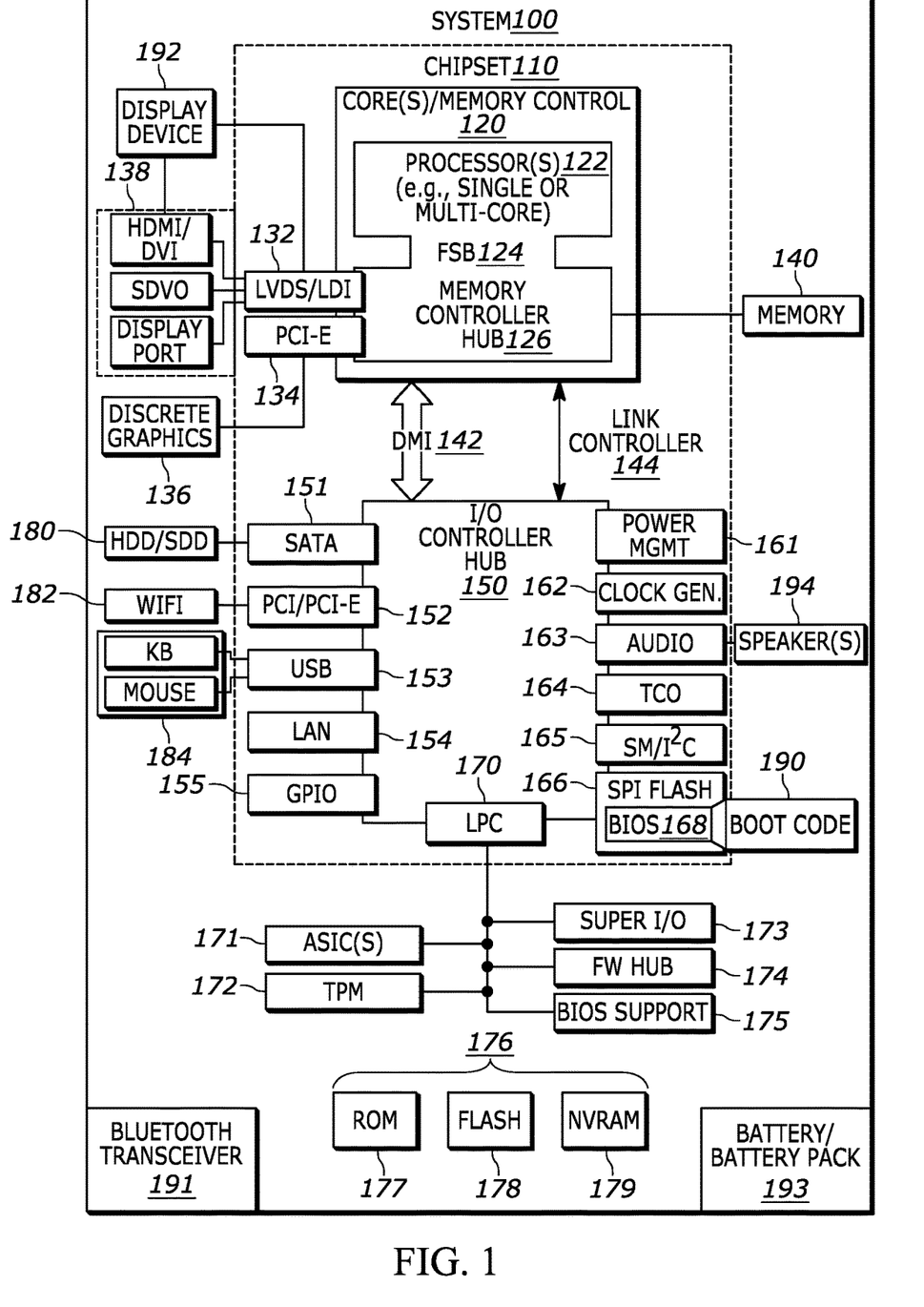
FIG. 1 is a block diagram of an example system consistent with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

As also shown in FIG. 1, the system 100 may include a Bluetooth transceiver and/or other short-range wireless communication transceiver 191 for use consistent with present principles. The Bluetooth communication transceiver 191 may be a classic Bluetooth transceiver and/or a Bluetooth low energy (BLE) transceiver (e.g., Bluetooth 5.0 transceiver) for communicating with other devices using Bluetooth communication protocols. Additionally, as alluded to above the transceiver 191 may also be configured for communication using other protocols as well and may therefore establish a Zigbee transceiver, Z-wave transceiver, near field communication (NFC) transceiver, infrared transceiver, a Wi-Fi direct transceiver, and/or wireless universal serial bus (USB) transceiver.

As also shown in FIG. 1, the system 100 may include a battery/battery pack 193. If a battery pack is used, in addition to containing one or more batteries with one or more respective battery cells, the battery pack 193 may include its own one or more processors, such as a microprocessor or any other type of processor that might be provided as part of a gas gauge or battery management unit (BMU) for the battery pack 193. Non-transitory storage may also be included in the battery pack 193, with the storage storing firmware in accordance with present principles to report on the state of charge of the battery(s) within the pack 193. Random access memory (RAM) and other items may also be included in the battery pack 193, such as one or more sensors for sensing and measuring things related to the battery pack 193 and/or battery cells within such as temperature, voltage, electric potential, age, impedance, state of charge, etc. Thus, these sensors may provide input/measurements to the processor(s) within the battery pack 193 and/or the processor(s) 122.

Additionally, note that the one or more battery cells within the pack 193 may be configured in jellyroll format. The cells may also be configured in pouch cell format in which the strip(s) of active material are folded, or in a stacked format. Regardless, the battery cells may be Lithium ion battery cells or another type of battery cell.

It is to be further understood in accordance with present principles that the battery pack 193 may be electrically coupled to and power the system 100, and/or individual components thereof, using battery power. The system 100 and/or battery back 193 in particular may also be electrically coupled to at least one charge receiver on the system 100 for receiving a charge via an AC/DC power supply connected to an AC power source (e.g., a wall outlet providing AC power) to charge the one or more battery cells in the pack 193. Thus, the charge receiver may include at least one circuit configured for receiving power from a wall outlet (or other AC power source) via the power supply and then providing power to the system 100 to power it and also providing power to the battery pack 193 to charge the cells within the pack 193. In some examples, wireless charging using a wireless charge receiver and wireless charge transmitting pad may be used.

Additionally, though not shown for simplicity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Still further, the system 100 may include an audio receiver/microphone that provides input from the microphone to the processor 122 based on audio that is detected, such as via a user providing audible input to the microphone, and a camera that gathers one or more images and provides input related thereto to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video. Also, the system 100 may include a GPS transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
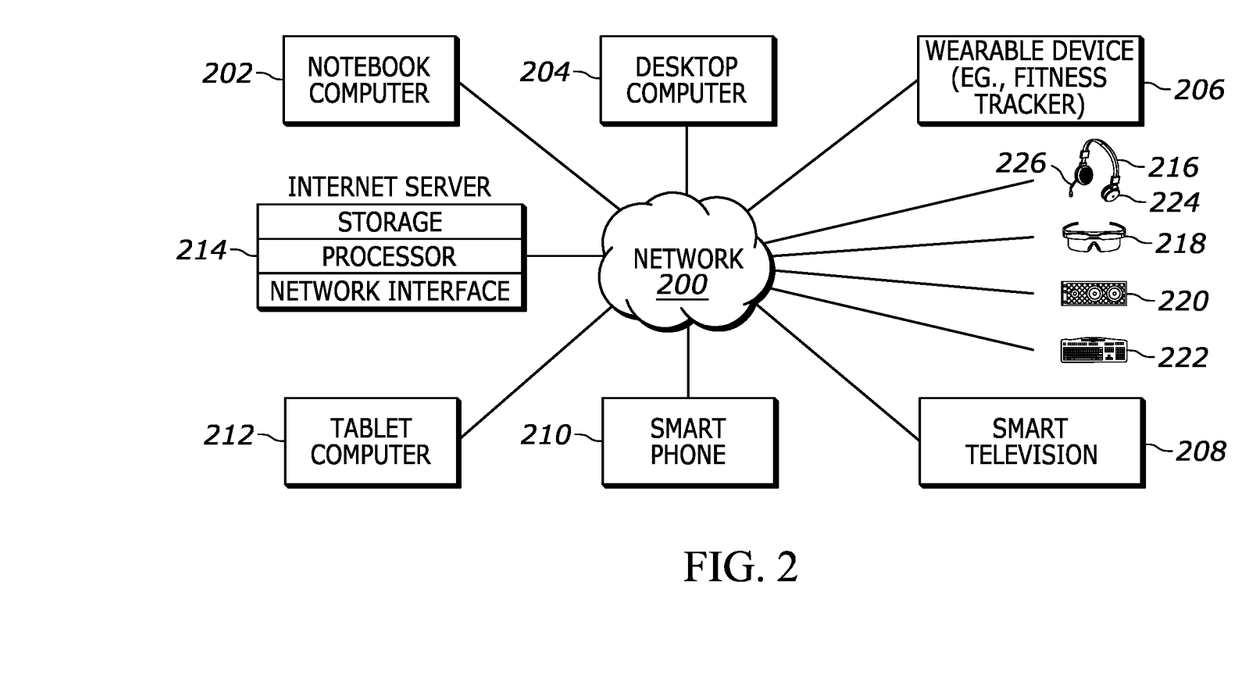
FIG. 2 is a block diagram of an example network of devices consistent with present principles.

Turning now to FIG. 2, example devices are shown communicating over a network 200 such as the Internet in accordance with present principles. The network 200 may also be established by paired, direct Bluetooth or other wireless short-range direct communication between the devices shown in FIG. 2. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a Bluetooth headset 216, wireless glasses 218, a Bluetooth speaker 220, Bluetooth keyboard 222, and a server 214 such as an Internet server that may provide cloud storage accessible to the devices 202-212, 216-222. It is to be understood that the devices 202-222 may be configured to communicate with each other over the network 200 to undertake present principles.

Describing some of the devices shown in FIG. 2 in more detail, the wearable device 206 may be, for example, a fitness tracker and/or smart watch that may communicate with the other devices shown in FIG. 2 such as the smart phone 210 using Bluetooth communication.

Describing the headset 216 in more detail, it may be engaged with a person's left or right ear or other portion of the head so that a speaker 224 abuts an ear of the user and a microphone 226 is positioned adjacent to the person's mouth. Thus, the speaker 224 may be used for listening to music or hearing audio of a telephone call while a user speaks into the microphone 226 as part of the telephone call.

As for the wireless glasses 218, note that they may communicate with one of the other devices shown in FIG. 2 (e.g., smart phone 210) via Bluetooth communication. Also note that rather than glasses, in some examples the device 218 may be a virtual reality headset or augmented reality headset configured to communicate consistent with present principles.

The Bluetooth speaker 220 may communicate via Bluetooth or another communication protocol to present music and other audio that might be streamed from one of the other devices shown in FIG. 2, such as the smart phone 210. The wireless keyboard 222 may also communicate via Bluetooth or another communication protocol but to provide input to one of the other devices of alphabetical or numerical characters selected via respective keys on the keyboard 222.

Figure 3:
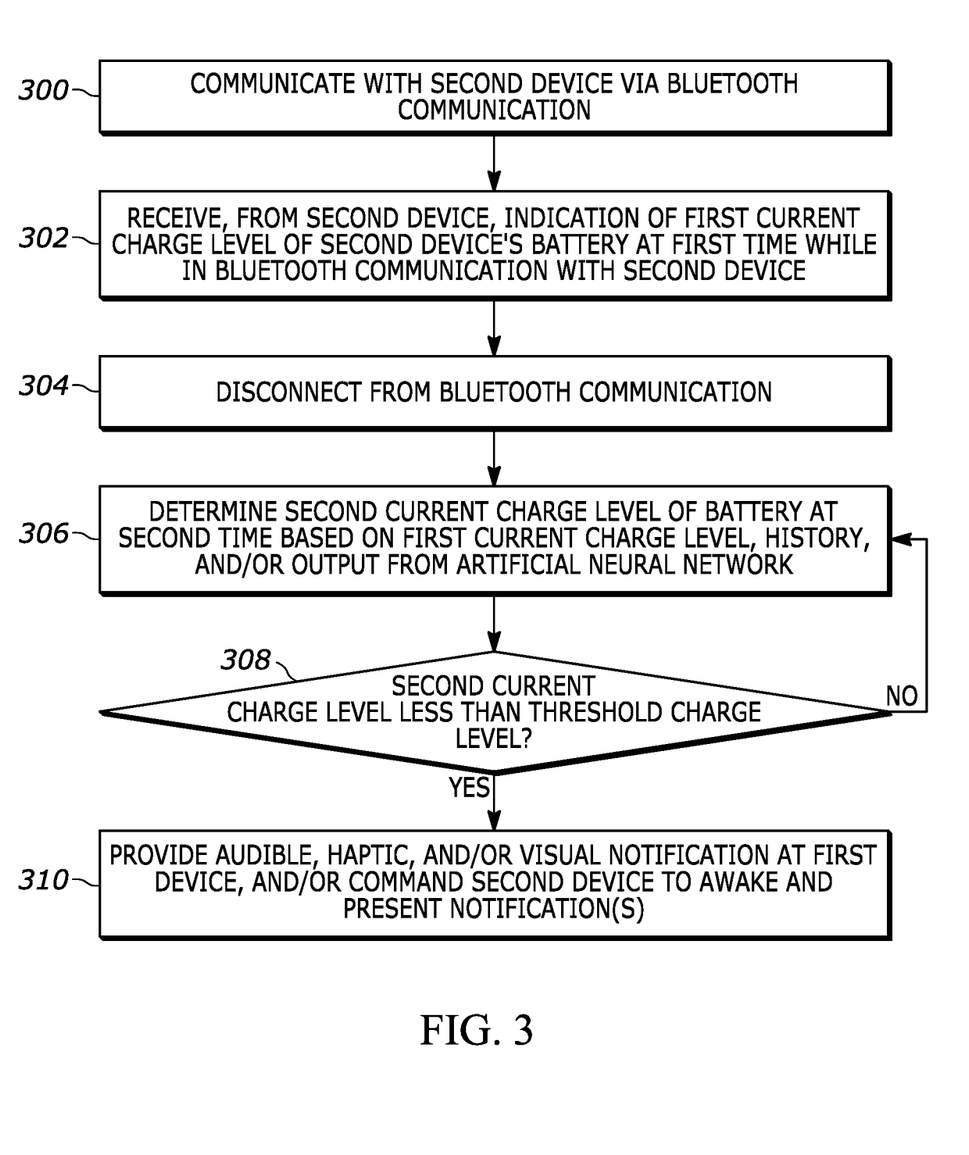
FIG. 3 is a flow chart of an example algorithm for determining a current charge level of a battery consistent with present principles.

Now referring to FIG. 3, it shows example logic that may be executed by a device such as a smart phone, laptop computer, or desktop computer that communicates with a wireless Bluetooth device such as a smart watch or headset that might have its battery continue to drain during an inactive state consistent with present principles. The device executing the logic of FIG. 3 will be referred to while describing FIG. 3 as the "first device", while the wireless Bluetooth device with battery being drained will be referred to while describing FIG. 3 as the "second device".

Beginning at block 300, the first device may communicate with the second device via Bluetooth or other wireless short-range communication. The logic may then proceed to block 302 where the first device may receive, from the second device and via Bluetooth communication, data indicating a current charge level of the second device's battery(s) at a first time. This current charge level at the first time will be referenced below as a "first current charge level". The first current charge level itself may have been reported by the battery's BMU to the second device's central processing unit (CPU) prior to being transmitted to the first device, or the second device's CPU itself may have determined the first current charge level.

From block 302 the logic may then proceed to block 304. At block 304 the first device may disconnect from Bluetooth communication with the second device. This may occur based on user command to disconnect, based on the first and second devices going out of wireless signal range of each other, based on the second device going in active, etc. On that, note that inactive may be established by the second device entering a sleep state where a current state of the device/its applications is still maintained in RAM and the second device is partially powered down. As another example, inactive may be established by the second device entering a hibernation state where a current state of the device/its applications from RAM is removed from RAM and instead stored in non-volatile storage such as a hard disk drive and the second device is powered down. As yet another example, inactive may be established by the second device entering an off state where the second device is completely powered down or is otherwise shut off (e.g., without a current state of the device being saved).

Still in reference to FIG. 3, from block 304 the logic may next proceed to block 306. At block 306 the first device may, while still not communicating with the second device itself, determine a current charge level of the battery(s) in the second device at a second time of day that is later than the first time. This current charge level at the second time will be referenced below as a "second current charge level".

The determination at block 306 may be in a number of different ways. For instance, a difference in level of charge for the second device's battery(s) over a certain amount of time that the second device was inactive may be indicated in a state of charge history for the battery that is appended each time the second device awakes from an inactive state. This history may then be used to divide each difference in level of charge for a respective period of inactivity by the amount of time for that respective period to determine a rate of discharge per time increment for the battery (e.g., in seconds, minutes, hours, etc.). This may be repeated for each period of inactivity in the history, or for a threshold number of most-recent periods of inactivity in the history (e.g., ten), to determine an average discharge per time increment. The average incremental rate of discharge may then be used at block 306 to determine the second current charge level based on the first current charge level at the first time and how much time has passed since the first time (e.g., multiply the average by the amount of time that has passed, and then subtract the result from the first current charge level to determine the estimated second current charge level). For example, the average incremental rate of discharge may be two percent discharge per hour while inactive as determined from past inactive times indicated in the history. Also note that battery age and degradation may over time also affect the average as discharge rates may increase linearly as age and/or degradation increase, and thus the increasing discharge rates may be indicated in the history itself and affect the average over time.

As another example, the first current charge level and the amount of time that has passed since the first time may be provided as input to an artificial intelligence model/predictive model including one or more artificial neural networks. The model itself may have one or more artificial neural networks (NNs) trained to make an inference about a current charge level of the particular battery(s) in the second device (or batteries in general) based on a last-reported current charge level at a certain time (e.g., the first current charge level at the first time) and how much time has passed since the last-reported current charge level. The NN(s) may be recurrent, convolutional, and/or deep NNs that may have been trained via supervised or unsupervised learning using the history mentioned in the paragraph above as well as future charge level reporting, for example. Note that the NN(s) themselves may have an input layer, an output layer, and multiple hidden layers between the input and output layers. The weights of the hidden layers may be adjusted over time (e.g., unsupervised by a computer or as supervised by a developer) to configure the NN(s) to render accurate inferences about a current charge level based on actual past amounts of discharge indicated in the history.

After the second current charge level has been determined at block 306, the logic may then proceed to decision diamond 308. At diamond 308 the first device may compare the second current charge level to a threshold charge level to determine whether the second current charge level is less than the threshold charge level. The threshold charge level itself may be stored in storage of the first device or may be accessible via remote storage, but in either case it may have been established by the end-user of the first device himself or herself. However, it may also be established by a manufacturer of the device, developer of a specific application being used to execute the logic of FIG. 3, etc.

A negative determination at diamond 308 may cause the logic to revert back to block 306 and proceed therefrom to, e.g., determine a third current charge level of the second device's battery(s) at a third time later than the second time and then compare that to the threshold charge level. However, also note that in some examples a negative determination may instead cause the logic to revert back to another block as appropriate (such as block 300).

In contrast, affirmative determination at diamond 308 may cause the logic to proceed instead to block 310. At block 310 the first device may provide an audible, haptic, and/or visual notification at the first device to charge the battery(s) of the second device.

If an audible notification is provided is to be provided at the first device at block 310, it may be provided via one or more speakers on the first device and may be established by an automated voice speaking words to charge the device. However, a predetermined chime or tone may also be presented via the speaker(s) to indicate that the second device should have its battery charged.

If a haptic notification is provided at the first device at block 310, it may be provided by actuating a vibrator within the first device, which may be established by an electric motor connected to an off-center and/or off-balanced weight via the motor's rotatable shaft. The shaft may then rotate under control of the motor to create vibration in a predetermined pattern and/or intensity to indicate that the second device should have its battery charged.

If a visual notification is provided is to be provided at the first device at block 310, it may be provided via one or more electronic displays on the first device and/or by illuminating one or more light-emitting diodes (LEDs) on a bezel of the first device in particular color such as red to denote that charging of the second device is needed. If presented on an electronic display, the visual notification may form part of a graphical user interface (GUI) that presents one or more graphical indications in text or non-text icon form to indicate that the second device's battery(s) should be charged, e.g., before a predicted upcoming activity for which the second device will be used.

Still in reference to block 310, in some examples the first device may additionally or alternatively provide a notification to charge the second device's battery(s) by transmitting a command(s) to the second device to awake from its inactive state and to one or more of produce a sound at the second device using a speaker on the second device to indicate the battery(s) should be charged, produce a haptic vibration at the second device using a vibrator in the second device to indicate the battery(s) should be charged, and illuminate a display on the second device and/or LED on the bezel of the second device to indicate the battery(s) should be charged. For example, a wake-up command may be sent to the second device via Bluetooth communication and then the first device may control the second device to present these types of notifications through paired communication authorizing the first device to control the second device.

Figure 4:
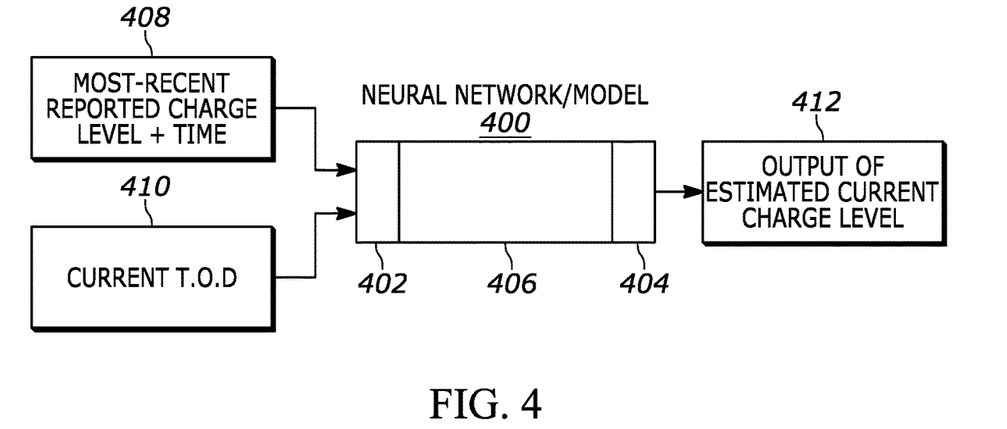
FIG. 4 shows a schematic diagram of example architecture for an artificial intelligence model that may help determine a current charge level of a battery consistent with present principles.

Now describing FIG. 4, it shows a schematic diagram of an artificial intelligence model/neural network 400 consistent with present principles. As indicated above, the NN 400 may include an input layer 402, an output layer 404, and multiple hidden layers 406 between the input and output layers 402, 404.

Thus, consistent with present principles a most-recent reported charge level and time at which the most-recent reported charge level was determined may be provided as input 408 to the input layer 402. A current time of day indicating an amount of time that has passed since the time of the most-recent reported charge level, and/or the amount of time itself, may also be provided as input 410 to the input layer 402. In some examples, the state of the device may also be provided as input to the input layer 402 (e.g., sleep, hibernate, or off). The hidden layers 406, which may include Softmax and fully-connected ReLU layers in some examples, may then be used to provide output to the output layer 404. The output layer 404 may be a classification layer that may then take this output from the hidden layers as input and classify the input to render/infer an output 412 of an estimated current charge level of the battery at the current time of day indicated in the input 410.

Figure 5:
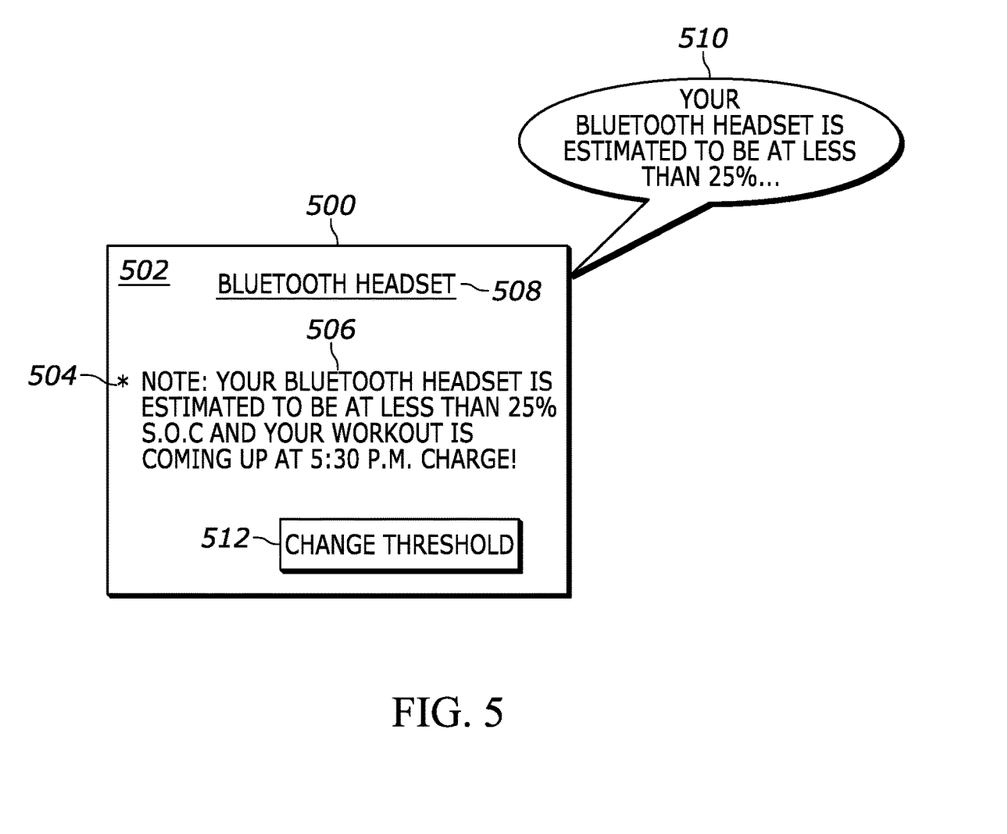
FIGS. 5 and 6 show example notifications that may be presented at the devices disclosed herein to notify a user to charge a battery of a device consistent with present principles.

Continuing the detailed description in reference to FIG. 5, it shows a display 500 of the first device described above in reference to FIG. 3 as it presents a graphical user interface (GUI) 502. As shown, the GUI 502 may present one or more visual notifications to charge the battery of a second device such as a Bluetooth headset or Bluetooth speaker consistent with present principles. The notifications may be presented in the form if a graphical icon 504 and/or text 506 along with a title 508 indicating the particular device to which the notifications pertain. In this example, the text 506 indicates, "Note: Your BT headset is estimated to be at less than 25% S.O.C. and your workout is coming up at 5:30 p.m. Charge!" Note that in this context, "BT" stands for Bluetooth and "S.O.C." stands for state of charge.

As also shown in FIG. 5, the first device 500 may also present an audio notification 510 reading the text 506 using an automated voice.

Regarding the predicted upcoming activity of a workout as indicated on the GUI 502, the first device may determine the predicted upcoming activity a number of ways to then indicate it on the GUI 502. For example, an electronic calendar for the end-user may be accessible to the first device to identify the activity from the calendar. As another example, user behavior may be learned over time and used to predict the future activity. As yet another example, a history of past user activities at particular times may be used to deduce the same activity as possibly being engaged in at a future time that matches a past time that the same activity was engaged in.

Additionally, in examples where the first device indicates the predicted upcoming activity via the GUI 502 or other notification type, the GUI 502 or other notification type may be presented responsive to a threshold time being reached that is before the start time of the predicted upcoming activity. Or, the GUI 502 may be presented at another time prior to this threshold time, such as at the time the first device disconnects from the second device based on the determination of the predicted upcoming activity and a determination to charge the device before the upcoming activity actually occurs. In any case, the threshold time itself may be a time of day at which charging should begin in order for the battery of the second device to be fully charged by the time of the start of the upcoming activity (or at least charged up to a threshold amount predicted to be needed to supply enough power to operate the second device during the duration of the upcoming activity). Time till fully charged and/or the threshold amount of battery power predicted to be needed may be determined based on respective histories accessible to the first device that indicate past charge cycles and battery power consumed in the past for similar/same activities.

As also shown in FIG. 5, in some examples the GUI 502 may include a selector 512. The selector 512 may be selectable to command the first device to present another GUI at which the threshold charge level described above in reference to diamond 308 may be set by the end-user. For example, selection of the selector 512 via cursor or touch input may command the device to present the GUI of FIG. 7, which will be described shortly.

Figure 6:
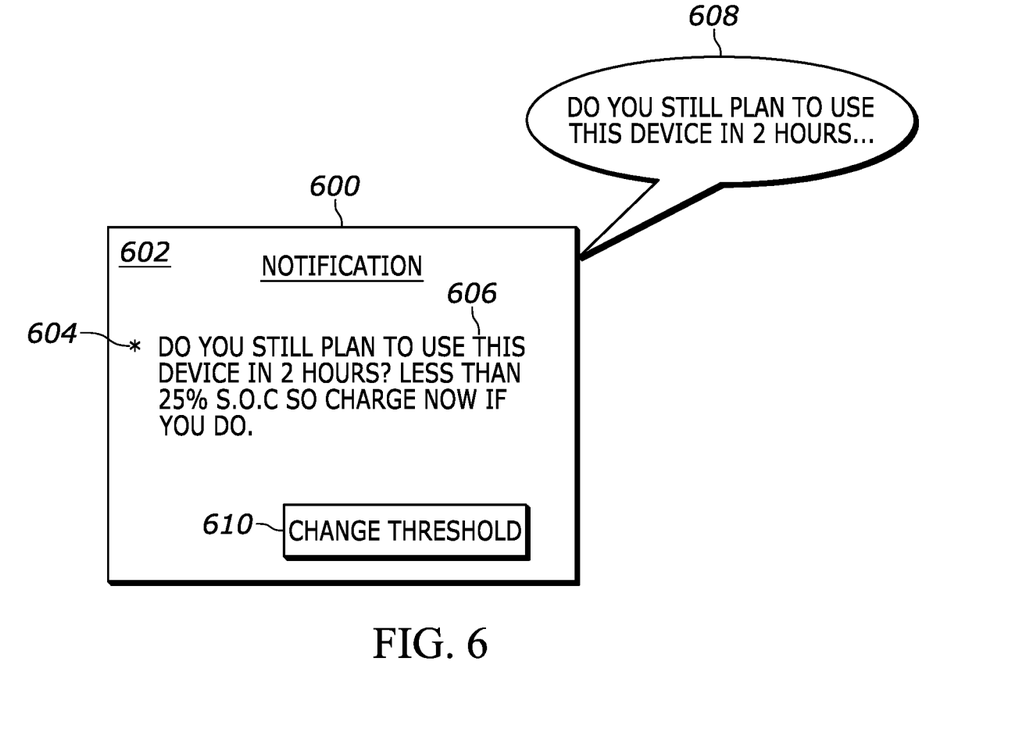

First, however, reference is made to FIG. 6. FIG. 6 shows a display 600 of the second device described above in reference to FIG. 3 (e.g., a Bluetooth headset) as it presents a graphical user interface (GUI) 602. As described above in reference to block 310, the GUI 602 may be presented at the second device based on a command from the first device.

As shown in FIG. 6, the GUI 602 may present one or more visual notifications to charge the battery of the second device consistent with present principles. The notifications may be presented in the form if a graphical icon 604 and/or text 606. In this example, the text 606 indicates "Do you still plan to use this device in 2 hours? Less than 25% S.O.C. so charge now if you do." Note that the prediction that the second device will be used in two hours may be made according to the description above (e.g., based on data in an electronic calendar). Also note that the GUI 602 itself may be commanded to be presented at the second device a threshold time before the predicted activity is to occur also in conformance with the description above.

FIG. 6 also shows that the second device 600 may also present an audio notification 608 reading the text 606 using an automated voice. In some examples, the GUI 602 may further include a selector 610 that may be selectable to command the second device to present another GUI at which the threshold charge level described above in reference to diamond 308 may be set by the end-user.

Figure 7:
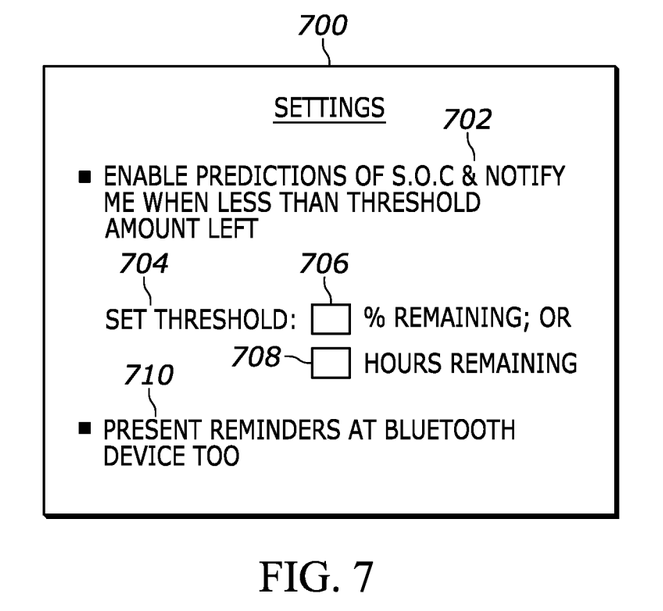
FIG. 7 shows an example settings graphical user interface (GUI) that may be presented on the display of a device to configure one or more settings of the device consistent with present principles.

Now describing FIG. 7, it shows a GUI 700 that may be presented on the display of the first device described above in reference to FIG. 3, such as a user's smart phone. However, in some examples certain elements of the GUI 700 may also be presented as part of a GUI presented at the second device described above in reference to FIG. 3.

In any case, the GUI 700 may include a first option or setting 702 that may be selectable by directing touch or cursor input to the adjacent check box. The setting 702 may be selectable to configure the device to undertake present principles. Thus, for example, the setting 702 may be selected to set or configure the device to execute the logic of FIG. 3 described above.

As also shown in FIG. 7, the GUI 700 may include a setting or option 704 at which the end-user may configure a threshold state of charge remaining to use consistent with present principles (e.g., at diamond 308) by directing input to input box 706. In some examples, the option 704 may include another input box 708 to establish the threshold not as a percentage state of charge remaining but rather in terms of estimated time of battery power remaining (e.g., two hours).

Still further, the GUI 700 may include an option or setting 710 that may be selectable to command the device to also present notifications about battery charging at the other device that is to be charged as well. And although not shown for simplicity, in some examples the GUI 700 may include respective options to select respective different notification types to present at either device as described herein, such as audible, visual, and haptic notifications.

Figure 8:
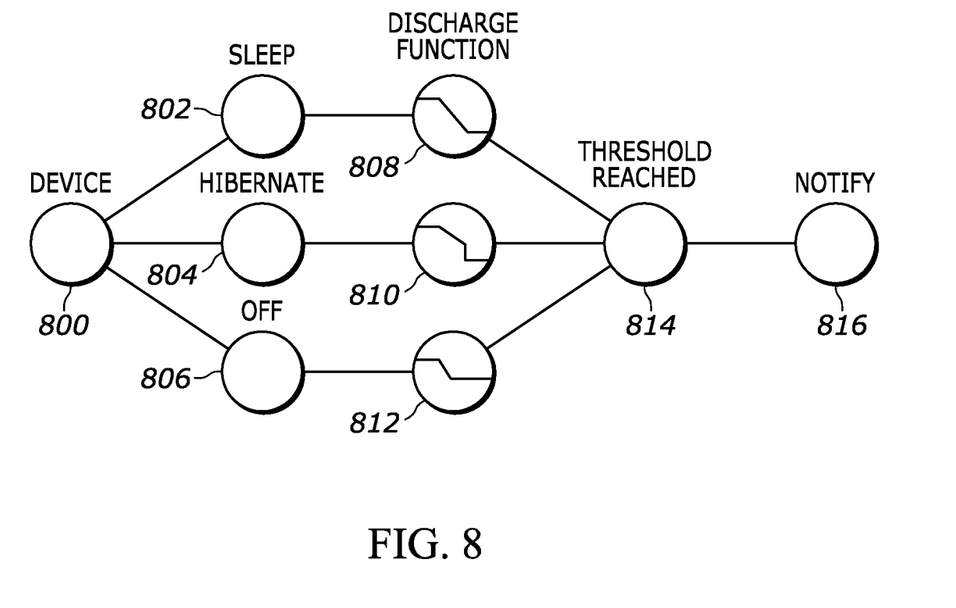
FIG. 8 is a schematic diagram of a finite state machine process consistent with present principles.

Now in reference to FIG. 8, it shows a schematic diagram of a finite state machine process that may be used as a non-artificial neural network example of a predictive model consistent with present principles. At 800, the device enters one of a sleep state 802, hibernation state 804, or off state 806. For each state, a respective discharge function 808, 810, 812 shows the discharge rate over time. At some point for any of the three states, the current charge level for the device's battery reaches a charge level threshold 814. Responsive to the threshold 814 being reached, a notification 816 may be provided.

It may now be appreciated that present principles provide for an improved computer-based user interface that improves the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
at least one processor;
a Bluetooth transceiver accessible to the at least one processor; and
storage accessible to the at least one processor and comprising instructions executable by the at least one processor to:
communicate with a second device via Bluetooth communication using the Bluetooth transceiver to determine a first current battery charge level of a battery in the second device;
disconnect from Bluetooth communication with the second device;
while disconnected from Bluetooth communication with the second device, determine a second current battery charge level of the battery in the second device, the second current battery charge level being less than the first current battery charge level; and
responsive to the current battery charge level not meeting a predetermined threshold battery charge level, provide a notification to charge the battery in the second device.

2. The first device of claim 1, wherein the first current battery charge level is the current battery charge level at a first time, and wherein the second current battery charge level is the current battery charge level at a second time that is after the first time.

3. The first device of claim 1, wherein the second current battery charge level is determined based on the first current battery charge level and a history of past battery charge levels.

4. The first device of claim 1, wherein the second current battery charge level is determined based on the first current battery charge level and using an already-trained artificial neural network (ANN) to infer, after the ANN is trained and while the first device is disconnected from Bluetooth communication with the second device, the second current battery charge level from the first current battery charge level.

5. The first device of claim 1, comprising a display accessible to the at least one processor, wherein the instructions are executable to:
provide the notification at least in part by presenting a visual notification on the display.

6. The first device of claim 1, comprising a speaker accessible to the at least one processor, wherein the instructions are executable to:
provide the notification at least in part by presenting an audio notification via the speaker.

7. The first device of claim 1, wherein the instructions are executable to:
provide the notification by transmitting a command to the second device to awake from an inactive state and to one or more of: produce a sound at the second device to indicate the battery should be charged, produce a haptic vibration at the second device to indicate the battery should be charged, illuminate a display on the second device to indicate the battery should be charged.

8. The first device of claim 7, wherein the inactive state comprises one or more of: a sleep state, a hibernation state, an off state.

9. The first device of claim 1, wherein the second device is one or more of: a Bluetooth headset, a Bluetooth keyboard, a Bluetooth speaker.

10. The first device of claim 1, wherein the predetermined threshold is set by an end-user prior to the determination of the second current battery charge level.

11. A method, comprising:
 determining, at a first device and while a second device is in an inactive state, an estimated current charge level of a battery in the second device; and
 responsive to determining that the estimated current charge level does not meet a predetermined threshold charge level, providing a notification to charge the battery in the second device;
 wherein the method comprises determining the estimated current charge level of the battery in the second device at least in part based on a last-reported current charge level of the second device while the second device was in communication with the first device; and
 wherein the method comprises determining the estimated current charge level of the battery at least in part by:
 providing both the last-reported current charge level and an amount of time that has passed since the last-reported current charge level was reported to an artificial neural network as input; and
 receiving, from the artificial neural network, an output indicating the estimated current charge level of the battery.

12. The method of claim 11, wherein the inactive state comprises one or more of: a sleep state, a hibernation state, an off state.

13. The method of claim 11, wherein the last-reported current charge level of the second device was provided to the first device by the second device via Bluetooth communication.

14. The method of claim 11, wherein the estimated current charge level not meeting the predetermined threshold charge level comprises the estimated current charge level being below the predetermined threshold charge level.

15. The method of claim 11, wherein providing the notification comprises one or more of: presenting a visual notification at the first device, presenting an audible notification at the first device.

16. At least one computer readable storage medium (CRSM) that is not a transitory signal, the computer readable storage medium comprising instructions executable by at least one processor to:
 determine, at a first device and while the first device is not in communication with a second device, an estimated current charge level of a battery in the second device; and
 responsive to a determination that the estimated current charge level does not meet a predetermined threshold charge level, provide a notification to charge the battery in the second device;
 wherein the instructions are executable to:
 provide the notification to charge the battery in the second device at least in part by presenting a graphical indication on a display that the battery should be charged before a predicted upcoming activity.

17. The at least one CRSM of claim 16, wherein the instructions are executable to:
 determine the estimated current charge level of the battery in the second device based on an output from an artificial neural network (ANN) configured to determine estimated current charge levels of the battery.

18. The CRSM of claim 17, wherein the ANN is already trained to determine the estimated current charge level of the battery in the second device prior to the determination, at the first device and while the first device is not in communication with the second device, of the estimated current charge level of the battery in the second device.

19. The first device of claim 1, wherein the notification is presented on a display, the notification indicating that the battery should be charged before an upcoming activity indicated via the text as part of the notification, the upcoming activity predicted at least in part by the first device.

20. The method of claim 11, wherein the artificial neural network is already trained to infer the estimated current charge level of the battery prior to the determining, at the first device and while the second device is in the inactive state, of the estimated current charge level of the battery in the second device.

* * * * *